United States Patent [19]

Davis et al.

[11] Patent Number: 5,151,150
[45] Date of Patent: Sep. 29, 1992

[54] MANUALLY CONTRACTABLE RING FOR SEALING AN ENVELOPE AGAINST A BEAD OF A TIRE DURING RETREADING

[76] Inventors: Archie B. Davis, P.O. Box 134, Aroda, Va. 22709; Joseph A. Troilo, Jr., P.O. Box 82, Brandy Station, Va. 22714

[21] Appl. No.: 629,883

[22] Filed: Dec. 19, 1990

[51] Int. Cl.$^5$ .............................................. B29D 30/56
[52] U.S. Cl. .................................. 156/384.1; 156/96; 156/909; 425/17
[58] Field of Search ....................... 156/96, 909, 394.1; 425/17, 20, 21, 27, 28.1, 36, 49, 51, 54, 58

[56] References Cited

U.S. PATENT DOCUMENTS

| | | | |
|---|---|---|---|
| 2,445,054 | 7/1948 | Baker | 425/17 |
| 2,447,035 | 8/1948 | Shell | 425/17 |
| 2,848,745 | 8/1958 | Morris | 425/58 X |
| 3,316,596 | 5/1967 | Robertson | 425/58 X |
| 4,600,467 | 7/1986 | Perdue | 156/394 |
| 4,624,732 | 11/1986 | King | 156/394 |
| 4,808,256 | 2/1989 | Hill | 156/394 |
| 4,861,247 | 8/1989 | Schimanek | 425/11 |

*Primary Examiner*—Geoffrey L. Knable
*Attorney, Agent, or Firm*—Sughrue, Mion, Zinn, Macpeak & Seas

[57] ABSTRACT

A split ring assembly for sealing an envelope against a bead of a tire to be retreaded includes a one-piece split metal ring having aligned overlapping end portions in the form of an interfitting fork and tongue. Laterally offset circumferentially overlapping arcuate slide bars welded side-by-side to the inner peripheral surface of the split ring, respective overlapping ends, and surrounded by a metal U-strap guide maintaining alignments of the contraction of the split ring. A lever pivoted at one end to one of the overlapped ends of the split ring is pivotably coupled radially outward of the pivot axis of that end of the lever to a turnbuckle whose opposite end is pivotably coupled to the other of the overlapped ends of the sealing ring such that rotation of the lever about its pivot axis causes the overlapped ends of the split ring to move towards each other, against the bias of the resilient split ring contacting the split ring radially and permitting the split ring assembly to be mounted inside of a tire at one side wall after contraction radially, against the bead of the tire, whereby release of the lever permits seal of an interposed envelope, against that bead.

6 Claims, 2 Drawing Sheets

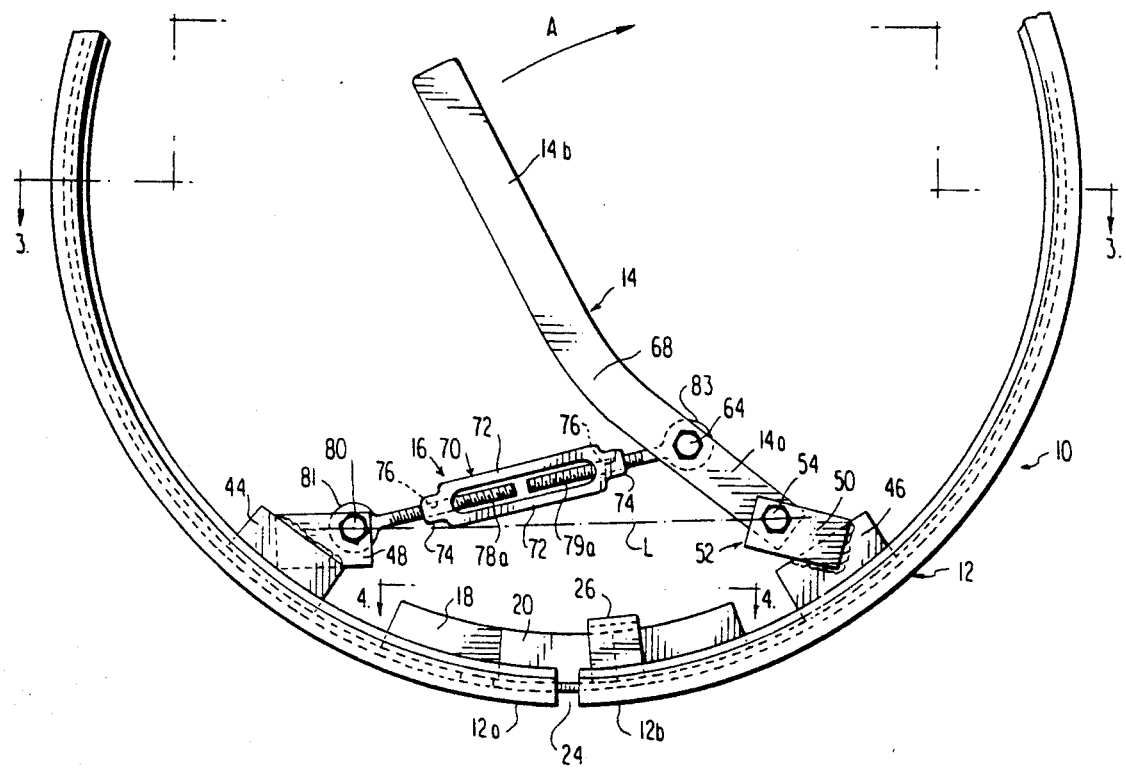
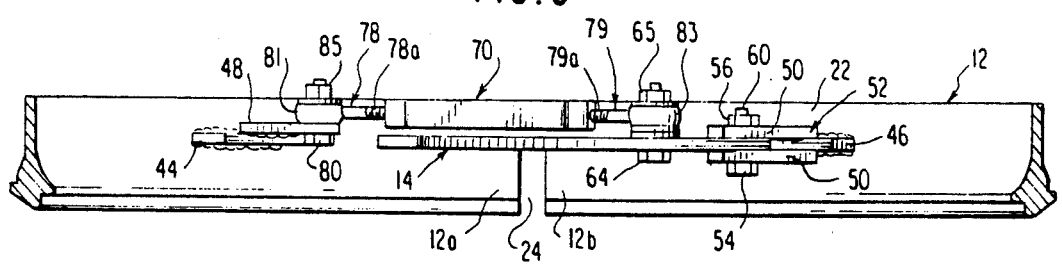
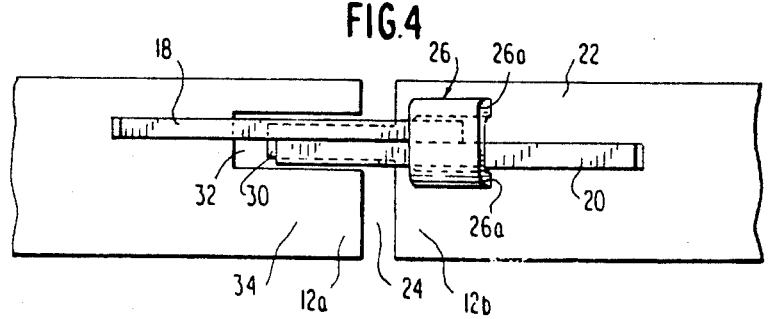

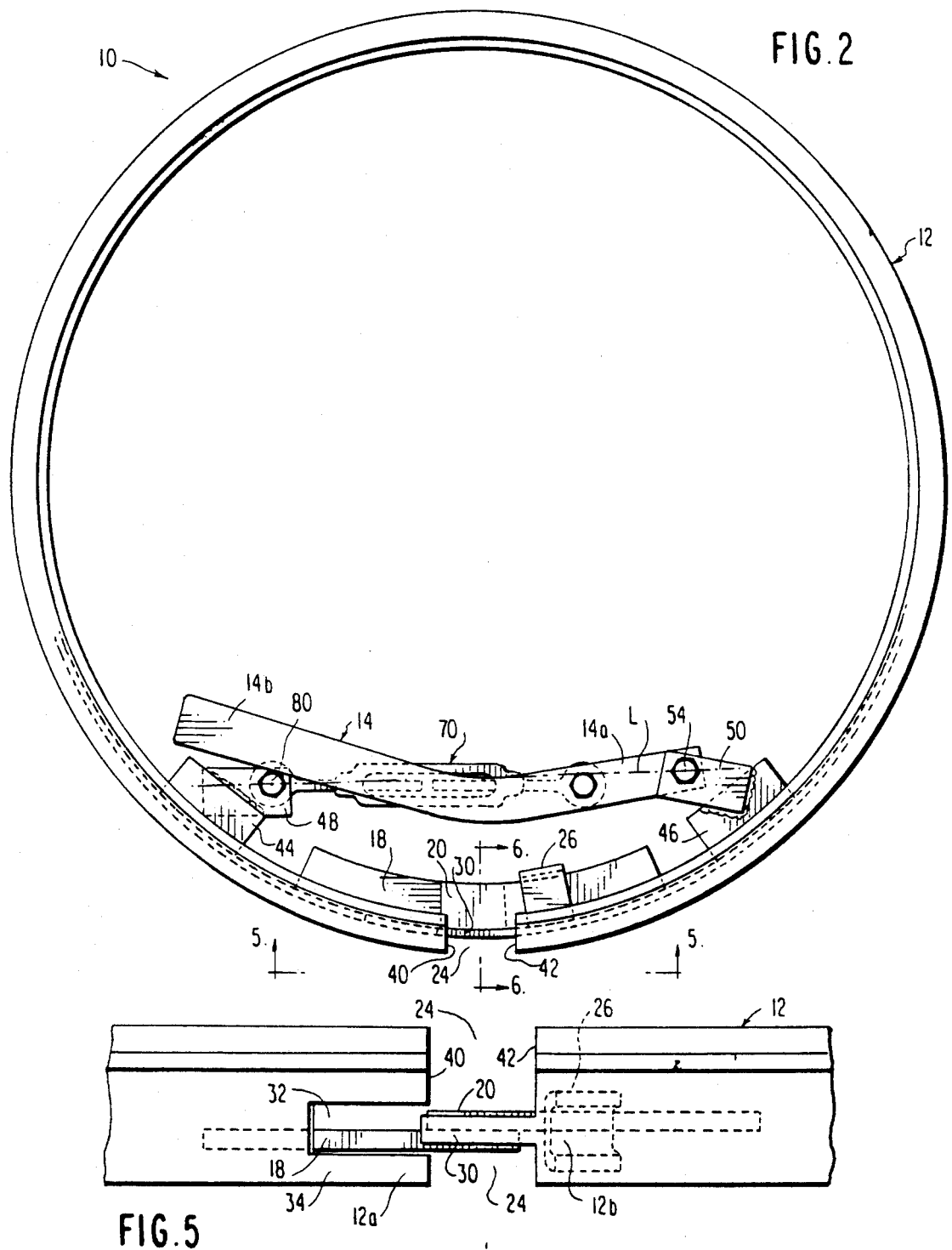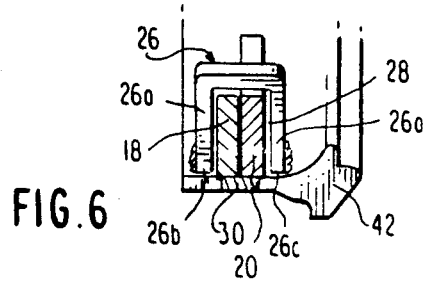

MANUALLY CONTRACTABLE RING FOR SEALING AN ENVELOPE AGAINST A BEAD OF A TIRE DURING RETREADING

FIELD OF THE INVENTION

This invention relates to split rings of spring steel or the like for peripheral sealing of an envelope against a bead of a tire to be retreaded by subsequent pressure and heat application in an autoclave, and more particularly to an integrated manually operable, adjustable length pivotable lever assembly on such ring for contraction of the ring and reduction in diameter to facilitate placement of the ring on the tire for self-bias sealing of the envelope by the ring upon release of a pivotable lever thereof.

Various recapping apparatus have evolved over the years for physically mounting and sealing of a U-shaped radial cross-section flexible curing envelope disposed about the periphery of a tire casing covering the tread and the outwardly facing side walls and bead portions of the tire casing for effecting a tight and uniform seal between the curing envelope and the tire casing. Such apparatus is required to be quickly mounted and dismounted to opposite sides of the tire while being capable of maintaining the seal during placement in an autoclave while subjected to relatively high pressure and temperature. Conventionally, the interior of the envelope is filled with air at a relatively high pressure to maintain a strip of tread peripherally about the tire carcass or casing to facilitate bonding of the tread to the periphery of the carcass.

U.S. Pat. No. 4,600,467 to Perdue entitled "Apparatus and Method for Tire Recapping" issued Jul. 15, 1986 shows the use of a pair of annular sealing members, each with a central hub and a peripheral circumferential surface engaging the bead portion of the tire casing and each being used with a cruciform backing member with radially progressing arms at circumferentially spaced portions extending at equal radial distances from the hub and engagable with the inwardly facing peripheral edge of the tire casing. A threaded fastener extends from each backing member through an aligned opening within a respective annular member. Nuts mounted on the threaded fastener cause the annular backing members to be drawn towards one another to clamp the edge of the envelope between the members in contact with the tire bead as the members are drawn together.

U.S. Pat. No. 4,624,732 to King entitled "Tire Envelope Sealing Apparatus for Recapping Tires" issued Nov. 25, 1986, utilizes a multi-part assembly including a pair of rigid circular ring members sized to fit against the exterior bead portion of a tire casing with an envelope interposed between the rings and the tire casing. A series of interconnecting springs have ends attached to respective rings at circumferentially spaced apart locations to hold them against the tire in the bead area. Spacers attached to at least some of the springs maintain a uniform distance between the bead portions of the tire casing. The springs couple both pair of rigid circular rings together and pass through a bore within the spacer members to hold the assembly in place and on the tire casing.

U.S. Pat. No. 4,808,256 to Hill entitled "Tire Recapping Apparatus" issued Feb. 28, 1989, employs a pair of clamping ring assemblies on opposite sides of the tire to seal the envelope around the tire in its bead area. A pressure ring portion fits around the outer bead area of the tire and carries four backup pads 24 adapted to engage the inner bead area of the tire. Linkage means is interposed within the & center of the ring, and connects to both the pressure ring and the backup pad and is controllable by a manually operable handle to move the pads in the direction of the ring. With the tire bead portion located between the ring and the aligned pads, the ring 22 presses the envelope against the tire bead area and thus seals it. A coil spring acts to bias the handle in fold down position to maintain an effective seal after simultaneously pivoted links pass an equilibrium point to the closed position where the backup pads engage the inner side of the tire bead.

U.S. Pat. No. 4,861,247 to Schimanek entitled "Expandable Ring for Sealing An Envelope Against the Bead of a Tire to be Retreaded" issued Aug. 29, 1989, utilizes a pair of spreadable rings on respective sides of the tire to force each ring to increase its diameter by increasing the distance between overlapping ends of the split spreadable ring, against the bias of the elastic ring. The ends of each ring overlap via a lap joint or a tongue and groove joint. Spreading is accomplished manually by use of a pivotable lever and a spreading link held in a respective spring block, driving the spreading link away from the pivot axis of the lever to radially enlarge the outer sealing surface of the ring against the bead of the tire. Removal of the spreading force permits the overlapping ends of each spreadable ring to move towards each other, reducing the diameter of the spreadable ring and permitting the ring's removal from the tire bead.

While such tire recapping apparatus as described above is successful and effective in maintaining a seal of the envelope to the bead of the tire on respective tire sides the apparatus disclosed in U.S. Pat. Nos. 4,600 467 and 4,624,732 are constituted by multiple parts which must be assembled and disassembled for each recapping operation which takes an inordinate amount of time, and which parts, in some cases, are relatively fragile and must be replaced after damage or destruction often resulting in significant down time of the apparatus.

Further, while the tire recapping apparatus of U.S. Pat. Nos. 4,808,256 and 4,861,247 constitute assemblies which are unitary and readily mountable to the sides of the tires and constitute rings which are adaptable to the tire beads, and are capable of maintaining the seal once accomplished, pressure application to effect and maintain the seal is limited to the areas of the four backup pads in the apparatus of U.S. Pat. No. 4,808,256, and the spreadable ring structure of U.S. Pat. No. 4,861,247 fails to employ the natural bias of the spreadable ring for effecting and maintaining the sealing of the envelope at the bead of the tire. Further, the structure of the '247 patent requires a spring block to overcome bead tolerance by having the rigid unitary spreading link movement compensated by elastic plunging of a counter bearing within the spring block.

It is therefore a primary object of the present invention to provide an improved, manually simple, split ring assembly for effecting and maintaining the sealing of an envelope against the bead of a tire to be retreaded using the inherent bias of the resilient split ring to effect sealing and a pivotable lever and turnbuckle arrangement whose members are pivoted to opposite sides of overlapping ends of the one-piece split ring and wherein in the relaxed and expanded condition, the diameter of the one-piece split ring is limited by the setting of the adjustable link turnbuckle and wherein the manual pivoting of the lever accomplishes reduction in ring diameter against the bias of the elastic material forming the ring to a sufficiently reduced diameter to permit inter-positioning of the split ring within the tire and in contact in the area of the bead with release of the lever causing the self-expansion ring force to seal the edge of the envelope against the tire bead by sandwiching that envelope between the periphery of the split ring and the tire bead.

BRIEF DESCRIPTION OF THE DRAWINGS

FIG. 1 is a side elevational view of a retractable ring assembly forming a preferred embodiment of the invention with the lever rotated to draw the overlapping ends of the split ring together to decrease the ring diameter, in a condition for mounting of the ring to the periphery of the tire, on one side thereof, FIG. 2 is a similar side elevational view of the manually retractable split ring assembly for sealing an envelope against the bead of a tire with the split ring relaxed, and radially expanded.

FIG. 3 is a plan view of a portion of the spreadable ring assembly showing the manually actuable over center toggle linkage for drawing the overlapping ends together and retracting the ring prior to placement of the ring assembly on a tire with the periphery of the ring sealing an envelope against the tire bead.

FIG. 4 is a radially enlarged top plan view of the section of the ring of FIG. 1 taken about line 4—4 showing the slide bars and the U-shaped guide for maintaining alignment of the split ring during radial expansion and contraction of the ring.

FIG. 5 is an enlarged, bottom plan view of a portion of the ring assembly of FIG. 2 taken about lines 5—5, with the ring in radially expanded condition.

FIG. 6 is a vertical sectional view of the overlap slide bars at the gap between overlap ends of the ring, taken about line 6—6 of FIG. 2.

DESCRIPTION OF THE PREFERRED EMBODIMENT

Referring to the drawings, an expandable and contractable split ring assembly is indicated generally at 10 and consists of a limited number of major elements. A split metal ring 12 is preferably formed of steel, although it may be formed of a light metal alloy or of plastic. The material making up the ring must be sufficiently resilient and flexible so that the diameter of the ring may be increased and decreased by the action of causing the respective ends 12a and 12b of ring 12 to move towards and away from each other due to the inherent spring nature of the material making up the ring. A manually actuated retraction and expansion lever 14 is pivotably mounted to one overlapped end 12b of ring 12, and is pivotably coupled to the opposite overlapped end 12a of the ring, via a turnbuckle 16.

Additionally, in order that the ends 12a and 12b are guided during contraction and expansion of ring 12, the assembly further includes side-by-side slide bars 18 and 20 welded to the inner peripheral surface 22 of the ring, respectively to ends 12, 12b and projecting radially upright toward the center of the ring 12. The slide bars, FIG. 6, overlap at the circumferential gap 24 between ends 12a, 12b, an extend across that gap. The maintenance of the alignment of the ends 12a, 12b of the ring is achieved by the use of an inverted. U-shaped guide or strap 26 whose legs 26a are welded at opposite ends 26b, 26c to the inner peripheral surface 22 of the ring. The opening 28 internally of the guide is sized so that the guide envelopes the side-by-side slide bars 18, 20, permitting slide bar 18 affixed to the end 12a of the ring to slide through the interior opening 28 of the guide in sliding contact with the wall of the guide leg on one side, and the surface of the adjacent slide bar 20 fixed to overlapping end 12b of the ring bearing the guide. Preferably end 12b of the split ring has a reduced width portion forming a tongue 30 which is of a lateral width which is in excess of that of the slot 32 formed within the other end 12a of the ring and which defines a fork 34, at that end. The length of the tongue 30 and that of the slot 32 is such that end faces 40 and 42 of the ring 12 preferably engage each other prior to bottoming out of the tongue 50 within slot 32. All of the elements making up the contractable ring assembly 10 may preferably be formed of metal such as stamped steel, cast iron, or the like. These elements must be capable of withstanding large mechanical forces in addition to the high temperature imposed by the autoclave on ring assembly during actual use.

Contraction and expansion of the split ring 12 is effected via the lever 14 acting through the turnbuckle 16. Welded or otherwise fixed to the inner peripheral surface 22 of the split ring 12 are bars welded to extend radially inwardly towards the center of that ring. The bars 44 and 46 are circumferentially spaced some distance from the ends of respective slide bars 18, 20 to the sides thereof remote from the gap. Welded to bar 44 is a hinge plate 48 which is of rectangular form, such that its longitudinal axis extends obliquely in the direction of pivotable lever 14. To the opposite side, a pair of hinge plates 50 of rectangular form are welded to opposite sides of bar 46 and have longitudinal axes which extend at a shallow oblique angle. The plates 50 form a clevis indicated generally at 52. The aligned holes are drilled within the ends of the plates 50 through which project a threaded shank 60 of bolt 54. The end of the shank 60 extends beyond the face of one plate opposite that of the head 50 of the bolt 54 and receives a nut 56. The threaded shank 60 also extends through a bore or first hole within the inner end 14a of lever 14 such that the lever 14 is pivotably mounted to clevis 52 for rotation about the axis of bolt 54. That end 14a of the lever is provided with a second hole 64, spaced from hole 62, passing therethrough, which second holes 64 receives a bolt 64. The second hole is some distance from their first hole 62 and between a bend point 68 of lever 14 and the first hole. The left side portion 14b of the lever is approximately 30° oblique to the axis of right side portion 14a bearing the first and second holes.

Turnbuckle 16 consists of an elongated, hollow body 70, having laterally opposed sides 72 and longitudinally opposed end walls 74. Tapped bores 76 within the end walls 76 receive threaded ends 78a of respective eye screws 78, whose circular heads 78b are respectively, pivotably mounted to lever 14 at the second holes at one end of the turnbuckle, and to the side of plate 48 to the left. FIG. 1. A bolt and nut coupling 80 completes the connection between the eye screw 78 and plate 48. As may be appreciated, by rotation of the body 70 about its longitudinal axis, lever or handle 14 is caused to pivot about its pivot axis defined by bolt 54. Further, by the pivot coupling between the respective eye screws 78 and hinge plate 48 and the lever 14 the extent of the expansion of ring 12 is controlled when the ring is in its relaxed state with the lever 14 pivoted to its maximum ring expansion, counterclockwise rotated position permitted by the turnbuckle 16, FIG. 2.

As may be appreciated a pair of rings 12 are sized to a particular bead diameter for a tire whose axial openings within the tire side walls, adjacent the bead are set by industry standards. Thus a pair of ring assemblies are employed for a given tire size and the contraction of the rings 12 necessary to permit mounting of the ring assemblies 10 to the outer walls of the tire being recapped is not considerable. The extent of movement of the end faces 40, 42 between ring end portions 12a, 12b may be on the order of an inch or two between full radially contracted and full radially expanded position of each ring 12. Ring contraction occurs prior to mounting, and expansion results by release of lever 14 with maximum expansion by movement from the position shown in FIG. 1 toward that of FIG. 2. Additionally while the drawings show the complete make-up of the manually actuable, contractable split ring assembly forming the present invention, the drawings do not show the application of the rings to a tire and specifically to opposite sides with the outer periphery of the split rings 12 in contact with the edge of the envelope and which in turn is pressed against the bead of the tire. The content of U.S. Pat. No. 4,861,247 is incorporated herein by specific reference. Reference may be had to FIG. 6 of that patent for an understanding of the position and placement of the contractable rings 22 for assemblies 10 employed in mounting side assemblies to the tire and in turn sealing the edges of an envelope against the beads of the tire. By the simple expedient of grasping the outer end 14b of the lever 14, the split ring assembly 10 may have its diameter sufficiently radially contracted by pivoting of the lever clockwise, to the position shown in FIG. 1. The ring 12 may then be physically positioned such that the outer peripheral surface 23 of the ring 12 is in contact with the envelope and pressing that envelope against the inner peripheral edge of the tire carcass adjacent the bead thereof, all in accordance with FIG. 6 of U.S. Pat. No. 4,861,247.

Of course, a significant difference exists in the method of operation and the nature of the clamping force provided in the present invention in contrast to the apparatus of U.S. Pat. No. 4,861,247. In the case of the simplified apparatus of this invention, the mere release of the lever 14 causes, by the resilience of the split ring 12 the radial expansion of the split ring 12. As the end faces 40, 42 of the ring overlapping portions 12a, 12b separate, a uniform compressive force is exerted on the outer peripheral surface 23 of the split ring 12 to effectively seal the envelope, at the bead of the tire, against the tire carcass. The inner end portion 14a of lever 14 of the turnbuckle 16, pvioted at one end to lever 15 at bolt 64 and to a ring 12 at the other end, form a toggle linkage, the bolt 64 connection to lever 14 of which passes overcenter, i.e., crosses center line L of FIG. 1 which extends between the first pivot axis of lever 14 at bolt 54 and the second pivot axis of turnbuckle eye 81, about bolt 80 at the plate 48. To effectively seal the envelope at the bend of the tire against the tire carcass, the lever 14 must rotate counterclockwise from the position shown in FIG. 1 to that shown in FIG. 2. Where the axes of bolts 54, 64 and 81 are in line, bolt 64 passes overcenter, FIG. 2. Such sealing once effected, is retained by the bias of the ring throughout the tire recapping operation.

While the present invention has been particularly set forth in terms of a specific embodiment, it will be understood by those of ordinary skill in this art that changes may be made to the apparatus disclosed and described herein and the invention is thus to be construed broadly and limited only by the scope and spirit of the claims appended hereto.

What is claimed is:

1. A manually actuable, contractable split ring assembly for sealing an envelope against a bead of at ire to be retreaded or repaired in an autoclave by pressure and heat treatment, said contractable ring assembly comprising:

a split ring of substantially rigid, elastic material having aligned, first and second overlapping end portions, said end portions being movable relative to each other due to the elastic nature of the ring material to increase the diameter of the split ring to effect sealing action and to decrease the diameter thereof to permit placement and removal of the ring on the tire and about the bead thereof, said ring having a generally cylindrical sealing surface and an axially outer part including a radially extending circumferential lip, an elongated lever having opposite ends, means for pivotably mounting one end of said lever to the inner peripheral surface of said split ring adjacent said first overlapping end portion for rotation about a first pivot axis parallel to the axis of the ring, a turnbuckle having a body with opposite ends, means for pivotably mounting one end of said turnbuckle body to the inner peripheral surface of said ring at said second overlapping end portion, remote from said pivoted lever for pivoting about a second pivot axis, and the other end of said turnbuckle body to said lever at a point radially outwardly of said lever pivot axis on said ring first overlapping end position to form a toggle linkage, whereby rotation of said lever away from said turnbuckle pivot coupling to said ring second overlapped portion causes said ring to contract in diameter against the bias of the elastic material ring to permit insertion of the ring within the tire side wall opening proximate to said bead, and wherein release of said lever allows said ring to expand radially under said bias, and pivoting said lever in the opposite direction results in ring expansion to the extent that said toggle linkage pivot connection of said lever to said turnbuckle moves overcenter of a line between said first and second pivot axes, and wherein by adjustment of the length of said turnbuckle the maximum expanded diameter of said ring may be preset.

2. The contractable split ring assembly as claimed in claim 1, wherein one of said overlapping end portions comprises a narrow, centrally located, laterally central tongue projecting from that end portion of said split ring, and the other of said overlapping end portions comprises a fork having a central groove of a width in excess of said tongue and positioned to receive said tongue, and wherein said split ring has affixed to the radially inner surface thereof, radially projecting, elongated slide bars perpendicular to the inner peripheral surface of said ring and extending circumferentially side-by-side across a circumferential gap between said overlapping end portions and functioning to slide on each other during expansion and contraction of said split ring to maintain alignment between the overlapping end portion of said ring.

3. The contractable split ring assembly as claimed in claim 2, further comprising an inverted U-shaped metal guide strap having laterally spaced legs fixedly mounted at ends thereof to the inner peripheral surface of said ring, within one of said overlapping end portions, and saddling said slide bars at positions where said side-by-side slide bars overlap to maintain circumferential alignment of said overlapped end portions of said split ring by maintaining said guide bars in side-by-side sliding arrangement.

4. The contractable split ring assembly as claimed in claim 1, wherein said means for pivotably mounting said pivotable lever comprises a clevis fixedly mounted to the inner peripheral surface of said split ring at one of said aligned overlapping end portions of said split ring, beyond the end of said slide bar remote from the gap between said overlapping end portions and wherein said means for mounting one end of said turnbuckle comprises a flat plate fixedly mounted to the inner peripheral surface of said split ring proximate to the end of said slide bar fixedly mounted to said other of said overlapping end portions, with the flat plate being generally in line with said clevis, and wherein eye screws are threaded to opposite ends of said turnbuckle body, said eye screws having circular heads extending from said opposite ends of said turnbuckle body, and wherein the heads of said eye screws are pivotably coupled respectively to said plate and said lever by bolts projecting through said circular heads of the eye screws.

5. The contractable split ring assembly as claimed in claim 2, wherein said means for pivotably mounting said pivotable lever comprises a clevis fixedly mounted to the inner peripheral surface of said spilt ring adjacent one of said aligned overlapping end portions of said split ring, positioned beyond the end of said slide bar remote from the gap between overlapping end portions and wherein said means for mounting one end of said turnbuckle comprises a flat plate fixedly mounted to the inner peripheral surface of said split ring proximate to the end of said slide bar fixedly mounted to said other of said overlapping end portions, with the plate being generally in line with said clevis, and wherein eye screws are threaded to opposite ends of said turnbuckle, said eye screws having circular heads extending from opposite ends of a turnbuckle body, and wherein the circular heads of said eye screws are coupled respectively to said plate and said lever by bolts projecting through said circular heads of the eye screws.

6. The contractable split ring assembly as claimed in claim 3, wherein said means for pivotably mounting said pivotable lever comprises a clevis fixedly mounted to the inner peripheral surface of said split ring at one of said aligned overlapping end portions of said split ring, beyond the end of said slide bar remote from the gap between overlapping end portions, and wherein said means for mounting one end of said turnbuckle comprises a flat plate fixedly mounted to the inner peripheral surface of said split ring proximate to the end of said slide bar fixedly mounted to said other of said overlapping end portions, with the plate being generally in line with said clevis, and wherein eye screws threaded to opposite ends of said turnbuckle, said eye screws having circular heads extending from said opposite ends of said turnbuckle body, and wherein the circular heads of said eye screws are coupled respectively to said plate and said lever by bolts projecting respectively through heads of the eye screws.

* * * * *